(12) United States Patent
Park (10) Patent No.: US 9,277,448 B2
(45) Date of Patent: Mar. 1, 2016

(54) METHOD OF EFFICIENCY IMPROVEMENT FOR CONTROL FRAMES IN 802.11AH

(71) Applicant: Minyoung Park, Portland, OR (US)

(72) Inventor: Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/126,751

(22) PCT Filed: Jun. 26, 2013

(86) PCT No.: PCT/US2013/047955
§ 371 (c)(1),
(2) Date: Dec. 16, 2013

(87) PCT Pub. No.: WO2014/163655
PCT Pub. Date: Oct. 9, 2014

(65) Prior Publication Data
US 2015/0036670 A1    Feb. 5, 2015

Related U.S. Application Data

(60) Provisional application No. 61/809,123, filed on Apr. 5, 2013.

(51) Int. Cl.
*H04W 28/06* (2009.01)
*H04W 52/02* (2009.01)
*H04W 84/12* (2009.01)

(52) U.S. Cl.
CPC ............ *H04W 28/06* (2013.01); *H04W 28/065* (2013.01); *H04W 52/0225* (2013.01); *H04W 84/12* (2013.01); *Y02B 60/50* (2013.01)

(58) Field of Classification Search
CPC .... H04W 28/06; H04W 28/065; H04W 84/12
See application file for complete search history.

(56) References Cited

U.S. PATENT DOCUMENTS

| | | | |
|---|---|---|---|
| 2005/0047357 A1 | 3/2005 | Benveniste | |
| 2005/0237984 A1 | 10/2005 | Benveniste | |
| 2009/0276646 A1 | 11/2009 | Woo | |
| 2010/0309831 A1 | 12/2010 | Yeh et al. | |
| 2013/0077610 A1* | 3/2013 | Amini et al. | 370/338 |
| 2014/0010223 A1* | 1/2014 | Wang et al. | 370/338 |
| 2014/0233478 A1* | 8/2014 | Wentink et al. | 370/329 |

OTHER PUBLICATIONS

International Search Report and Written Opinion, PCT/ISA/210, PCT/ISA/220, PCT/ISA/237, mail date Jan. 23, 2014.
Korean Office Action mailed Jun. 1, 2015 in corresponding Korean Patent Application No. 2014-7026997 (9 pages).
Fischer, Matthew et al., "Target Wake Times," EEE 802.11-12/0823r0, Jul. 12, 2012 (16 pages).
Kwon, Hyoungjin et al., "Non-TIM Allocation," IEEE 802.11-12/0867r0, Jul. 16, 2012 (9 pages).

* cited by examiner

*Primary Examiner* — Mohammad Anwar
(74) *Attorney, Agent, or Firm* — Pillsbury Winthrop Shaw Pittman LLP (57) ABSTRACT

Systems and methods are presented that a STA that has not set up a target wake time (TWT) schedule with an AP to use a control frame without incurring the overhead of the Next TWT field in order to determine AP changes or to sync with the AP's time synchronization function without receiving a beacon. In an embodiment, the configuration may include using one bit in a frame control (FC) field of a control frame to indicate a presence of a Next TWT field, such that the Next TWT field is optionally present in the control frame and contains the next target wake time value for an intended recipient of the control frame.

18 Claims, 5 Drawing Sheets

| Octets: | 2 | 2 | 6 | 6 | 1 | 5 | 6 | 4 |
|---|---|---|---|---|---|---|---|---|
| | FC | Duration | RA (A1) | TA (A2) | Beacon Sequence | Partial Timestamp | Next TWT (Optional) | FCS |

| Octets: | 2 | 2 | 6 | 1 | 5 | 6 | 4 |
|---|---|---|---|---|---|---|---|
| | FC | AID (RA) | TA | Beacon Sequence | Partial Timestamp | Next TWT | FCS |

FIG. 5

| Octets: | 2 | 2 | 2 | 6 | 1 | 5 | 6 | 2 | 2 | 4 |
|---|---|---|---|---|---|---|---|---|---|---|
| | FC | Duration | AID (RA) | TA (A2) | Beacon Sequence | Partial Timestamp | Next TWT | Start Sequence Number | BAT Information | FCS |

FIG. 6

METHOD OF EFFICIENCY IMPROVEMENT FOR CONTROL FRAMES IN 802.11AH

CROSS-REFERENCE TO RELATED APPLICATIONS

This application is the U.S. National Stage of PCT/US2013/047955, filed Jun. 26, 2013, which in turn claims the benefit of priority to U.S. Provisional application No. 61/809,123, filed on Apr. 5, 2013, the entire contents of all applications are incorporated herein by reference in their entireties.

FIELD OF THE INVENTION

Embodiments described herein are generally related to the field of wireless communications. More particularly, the embodiments are related to control frames for packets communicated between wireless transmitters and receivers.

BACKGROUND

Definitions (a) Wireless medium (WM): The medium used to implement the transfer of protocol data units (PDUs) between peer physical layer (PHY) entities of a wireless local area network (LAN); (b) Station (STA): Any device that contains an IEEE 802.11-conformant medium access control (MAC) and physical layer (PHY) interface to the wireless medium; (c) Access Point (AP): Any entity that has a station (STA) functionality and provides access to the distribution services, via the wireless medium for associated STAs; and (d) Beacon Frame: A Beacon frame is one of the management frames in IEEE 802.11 based WLANs. It contains all the information about the network. Beacon frames are transmitted periodically to announce the presence of a Wireless LAN network. Beacon frames are transmitted by the Access Point (AP) in an infrastructure basic service set (BSS). In independent BSS (IBSS) network beacon generation is distributed among the stations. For example, a Beacon frame can include a MAC header, Frame body and FCS and have fields including a timestamp field, a beacon interval field which is a time-interval between beacon transmissions, and capability information field which can span 16 bits and contain information about capability of the device/network.

The IEEE (Institute of Electrical and Electronics Engineers) 802.11ah specification framework as defined in the Specification Framework for TGah, 802.11-11/1137r12(https://mentor.ieee.org/802.11/dcn/11/11-11-1137-12-00ah-specification-framework-for-tgah.docx) defines a control frame called training acknowledge (TACK) which is a variant of the ACK frame. When a transmitting device first transmits one or more contiguous data frames to a receiving device, the receiving device returns a TACK frame to the transmitting device that includes adaptation information measured over the data frame(s) by the receiving device. This is done to harmonize various signal parameters of the receiving device and the transmitting device.

The TACK frame includes a Beacon Sequence field, a Partial Timestamp field and a Next TWT field (TWT: Target Wake Time). This control frame is sent by an AP to acknowledge reception of a data frame and at the same time send necessary information to update the STA. Other control frames such as STACK and BAT also contain information similar to that of the TACK frame.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Described herein are embodiments for allowing a STA that has not set up a target wake time (TWT) schedule with an AP to use a control frame without incurring an overhead of the Next TWT field in order to determine the changes of the AP or to sync to the AP's time synchronization function without receiving a beacon. In an embodiment, a method may include using one bit in a frame control (FC) field of a control frame to indicate a presence of a Next TWT field, wherein the Next TWT field is present optionally in the control frame, wherein the Next TWT field contains the next target wake time value for an intended recipient of the control frame.

Logic, modules, devices, and interfaces described herein may perform functions that may be implemented in hardware and/or code. Hardware and/or code may include software, firmware, microcode, processors, state machines, chipsets, or combinations thereof designed to accomplish the functionality.

Embodiments may facilitate wireless communications. Some embodiments may integrate low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications(http:// standards.ieee.org/getieee802/download/802.11-2007.pdf), communications in networks, messaging systems, and smart-devices to facilitate interaction between such devices. Furthermore, some wireless embodiments may incorporate a single antenna while other embodiments may employ multiple antennas.

In accordance with various embodiments of the present disclosure, a method related to wireless communication, e.g., based on IEEE 802.11 specification, for allowing a STA that has not set up a target wake time (TWT) schedule with an AP to use a control frame without incurring an overhead is presented. The method may include, for example, using one bit in a frame control (FC) field of a control frame to indicate a presence of a Next TWT field, wherein the Next TWT field is present optionally in the control frame, wherein the Next TWT field contains the next target wake time value for an intended recipient of the control frame.

The control frame in various embodiments may comprise, for example, a TACK frame, a STACK frame, a BAT frame, or any other frame that may be specified and incorporated in the 802.11 specification in the future. A S1G Control Extension field may be included in the frame control (FC) field of the control frame to indicate whether the control frame is, for example, a TACK frame, a STACK frame, a BAT frame or any other frame. In some embodiments, the S1G Control Extension field may have two (2) bits.

Figure 1:
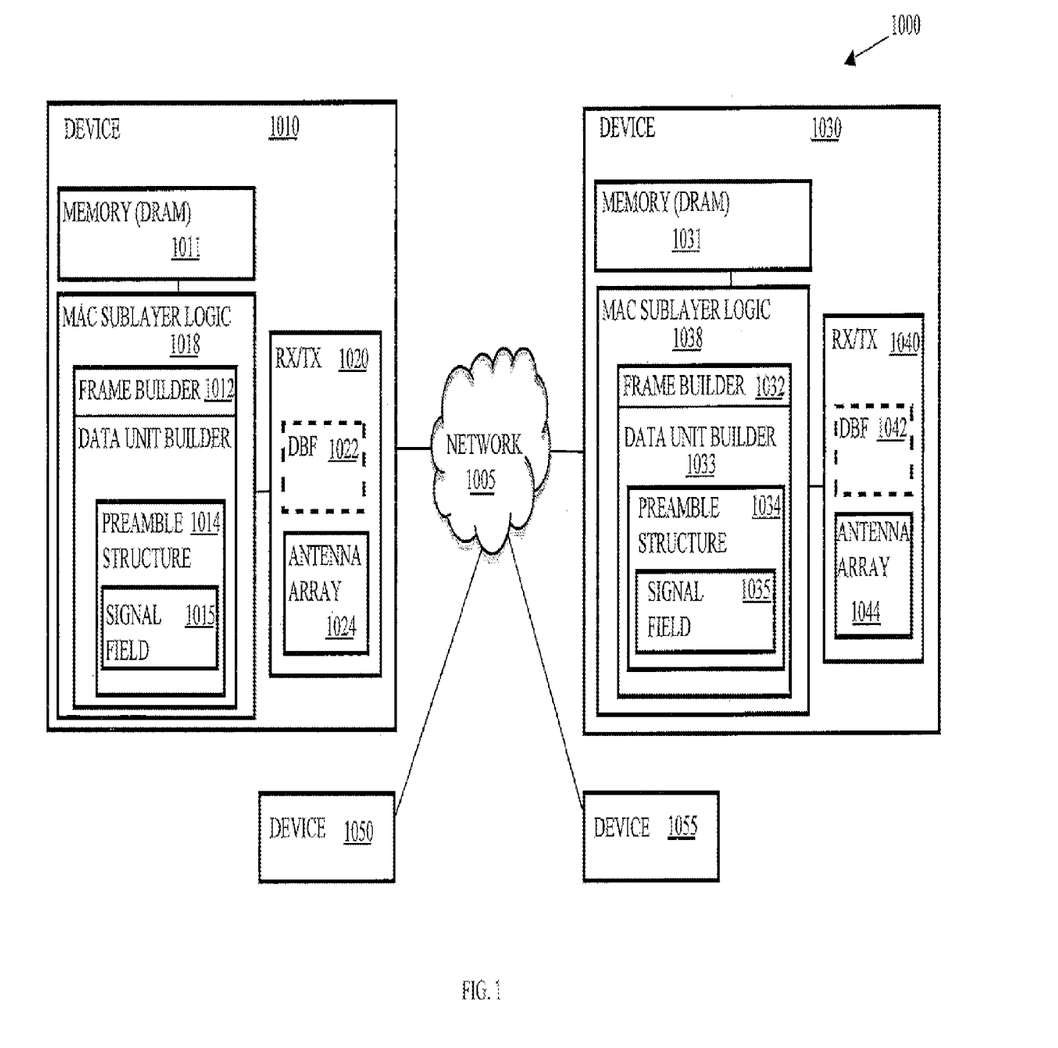
FIG. 1 depicts an embodiment of an example wireless network comprising a plurality of communication devices, including multiple fixed or mobile communication devices in accordance with various aspects and principles of the present disclosure.

Turning now to FIG. 1, there is shown an embodiment of a wireless communication system 1000 in accordance with various aspects and principles of the present disclosure. Wireless communication system 1000 includes communication device 1010 that is wire line or wirelessly connected to network 1005. Communication device 1010 may communicate wirelessly with a plurality of communication devices 1030, 1050, and 1055 via network 1005. Communication devices 1010, 1030, 1050, and 1055 may include sensors, stations, access points, hubs, switches, routers, computers, laptops, notebooks, cellular phones, Personal Digital Assistants (PDAs), or other wireless-capable devices. Thus, communication devices 1010, 1030, 1050, and 1055 may be mobile or fixed. For example, communication device 1010 may include a metering substation for water consumption within a neighborhood of homes. Each of the homes within the neighborhood may include a communication device such as communication device 1030 and communication device 1030 may be integrated with or coupled to a water usage meter. Periodically, communication device 1030 may initiate communication with the metering substation to transmit data related to water usage. Furthermore, the metering station or other communication device may periodically initiate communication with communication device 1030 to, e.g., update firmware of communication device 1030. In other embodiments, communication device 1030 may only respond to communication and may not include logic that initiates communication.

In further embodiments, communication device 1010 may facilitate data offloading. For example, communication devices that are low power sensors may include a data offloading scheme to, e.g., communicate via Wi-Fi, another communication device, a cellular network, or the like for the purposes of reducing power consumption consumed in waiting for access to, e.g., a metering station and/or increasing availability of bandwidth. Communication devices that receive data from sensors such as metering stations may include a data offloading scheme to, e.g., communicate via Wi-Fi, another communication device, a cellular network, or the like for the purposes of reducing congestion of network 1005. It is to be understood that the example provided here is illustrative and a skilled artisan will be able to conceive other examples and systems based on the description provided herein.

Network 1005 may represent an interconnection of a number of networks. For instance, network 1005 may couple with a wide area network such as the Internet or an intranet and may interconnect local devices wired or wirelessly interconnected via one or more hubs, routers, or switches. In the present embodiment, network 1005 communicatively couples communication devices 1010, 1030, 1050, and 1055.

Communication devices 1010 and 1030 include memory 1011 and 1031, and Media Access Control (MAC) sublayer logic 1018 and 1038, respectively. Memory 1011, 1031 such as Dynamic Random Access Memory (DRAM) may store the frames, preambles, and preamble structures 1014 and 1034, or portions thereof. The frames (also referred to as MAC layer Protocol Data Units (MPDUs)), and preamble structures 1014 and 1034 may establish and maintain synchronized communications between the transmitting device and the receiving device. Preamble structures 1014 and 1034 may also establish the communication format and rate. In particular, preambles generated or determined based upon preamble structures 1014 and 1034 may train, e.g., antenna arrays 1024 and 1044 to communicate with each other, establish the modulation and coding scheme of the communications, the bandwidth or bandwidths of the communications, the length of the transmission vector (TXvector), the application of beamforming, and the like.

MAC sublayer logic 1018, 1038 may generate the frames and physical layer data units (PPDUs). More specifically, frame builders 1012 and 1032 may generate frames and data unit builders 1013 and 1033 may generate PPDUs. Data unit builders 1013 and 1033 may generate PPDUs by encapsulating payloads comprising the frames generated by frame builders 1012 and 1032. In the present embodiment, data unit builders 1013 and 1033 may encapsulate the frames with preambles based upon preamble structures 1014 and 1034, respectively, to prefix the payloads to be transmitted over one or more RF channels. The function of a data unit builder, such as data unit builder 1013 or 1033, is to assemble groups of bits into code words or symbols that make up the preambles as well as the payloads so the symbols can be converted into signals to transmit via antenna arrays 1024 and 1044, respectively.

Each data unit builder 1013, 1031 may supply preamble structures 1014, 1034 including signal field portions 1015, 1035, and store the preambles generated based upon preamble structures 1014, 1034 in memory 1011, 1031, while the preambles are being generated and/or after the preambles are generated. In the present embodiment, preamble structures 1014, 1034 include one short training field (STF) and one long training field (LTF) prior to signal fields 1015, 1035 and the data payload. The STF and the LTF may train antenna arrays 1022 and 1042 to communicate with each other by making measurements related to communications such as measurements related to relative frequency, amplitude, and phase variations between quadrature signals. In particular, the STF may be used for packet detection, automatic gain control, and coarse frequency estimation. The LTF may be used for channel estimation, timing, and fine frequency estimation for a spatial channel.

In some embodiments, signal fields 1015, 1035 provides information related to physical layer parameters used for or to establish wireless communication of the data unit. Such physical layer parameters may include parameters representing modulation and coding scheme (MCS), bandwidth, length, beamforming, space time block coding (STBC), coding, aggregation, short guard interval (Short GI), cyclic redundancy check (CRC), and a tail. The CRC field may include a four-bit cyclic redundancy check sequence providing a Hamming distance of one or two.

Communication devices 1010, 1030, 1050, and 1055 may each include a transceiver (RX/TX) such as transceivers (RX/TX) 1020 and 1040. Each of the transceivers 1020, 1040 includes an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom. FIG. 1 may depict a number of different embodiments including a Multiple-Input, Multiple-Output (MIMO) system with, e.g., four spatial streams, and may depict degenerate systems in which one or more of communication devices 1010, 1030, 1050, and 1055 include a receiver and/or a transmitter with a single antenna including a Single-Input, Single Output (SISO) system, a Single-Input, Multiple Output (SIMO) system, and a Multiple-Input, Single Output (MISO) system. Wireless communication system 1000 of FIG. 1 is intended to represent an Institute for Electrical and Electronics Engineers (IEEE) 802.11ah system. Similarly, communication devices 1010, 1030, 1050, and 1055 are intended to represent IEEE 802.11ah devices.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between a transmitter and a receiver via one of the channels. Pilot tones are used to maintain the channels, and may provide information about time/frequency and channel tracking. Guard tones may be inserted between symbols such as, for example, the STF and LTF symbols during transmission to avoid inter-symbol interference (ISI), which might result from multi-path distortion. These guard tones also help the signal conform to a spectral mask. The nulling of the direct component (DC) may be used to simplify direct conversion receiver designs.

In one embodiment, communication device 1010 optionally includes a Digital Beam Former (DBF) 1022, as indicated by the dashed lines. DBF 1022 transforms information signals into signals to be applied to elements of antenna array 1024. Antenna array 1024 is an array of individual, separately excitable antenna elements. The signals applied to the elements of antenna array 1024 cause antenna array 1024 to radiate one to four spatial channels. Each spatial channel so formed may carry information to one or more of communication devices 1030, 1050, and 1055. Similarly, communication device 1030 includes transceiver 1040 to receive and transmit signals from and to communication device 1010. Transceiver 1040 may include antenna array 1044 and, optionally, DBF 1042. In parallel with Digital Beam Forming, transceiver 1040 is capable of communicating with IEEE 802.11ah devices.

Figure 2:
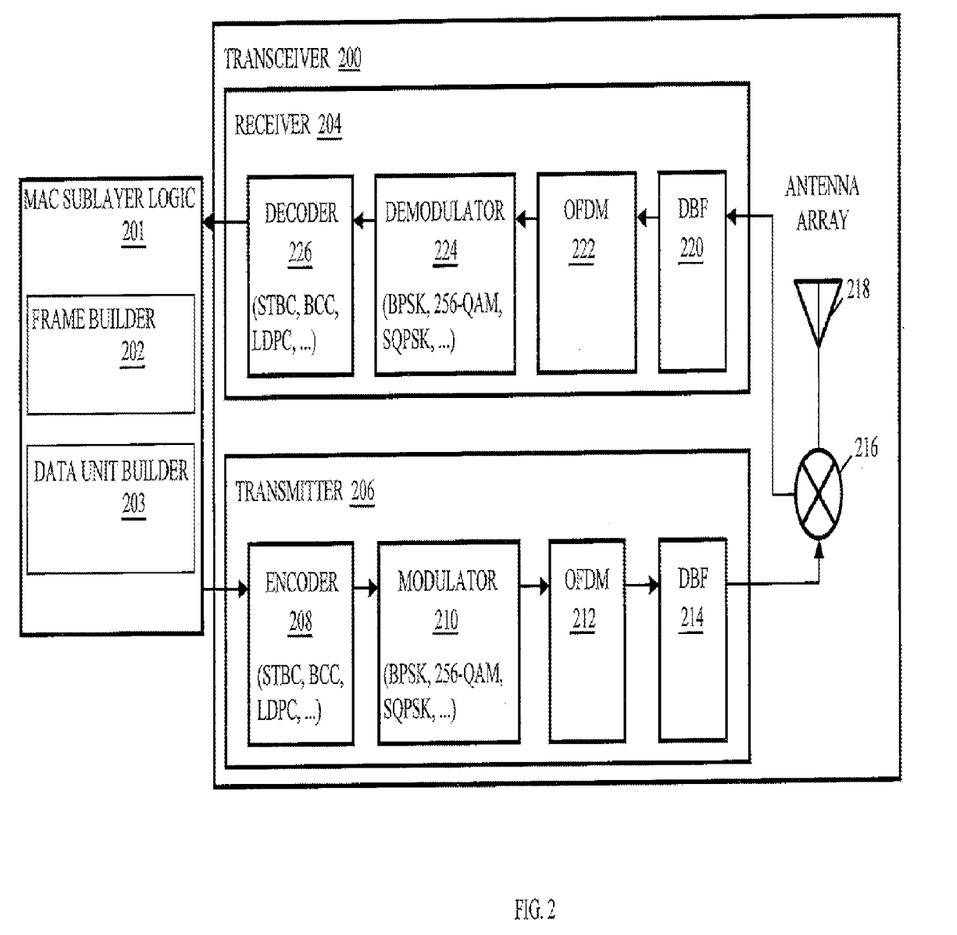
FIG. 2 depicts an embodiment of an apparatus to generate and transmit an Orthogonal Frequency Division Multiplexing (OFDM)-based communication in a wireless network in accordance with various aspects and principles of the present disclosure.

FIG. 2 illustrates an embodiment of an apparatus to transmit an Orthogonal Frequency Division Multiplexing (OFDM)-based communication in a wireless network in accordance with various aspects and principles of the present disclosure. The apparatus includes transceiver 200 coupled with Medium Access Control (MAC) sublayer logic 201. MAC sublayer logic 201 may generate a physical layer protocol data unit (PPDU) to transmit via transceiver 200.

MAC sublayer logic 201 may include hardware and/or code to implement data link layer functionality including generation of MAC protocol data units (MPDUs) from MAC service data units (MSDUs) by encapsulating the MSDUs in frames via frame builder 202. For example, a frame builder may generate a frame including a type field that specifies whether the frame is a management, control or data frame and a subtype field to specify the function of the frame. A control frame may include a Ready-To-Send or Clear-To-Send frame. A management frame may include a Beacon, Probe Response, Association Response, and Reassociation Response frame type. The management frame may include one or more bits defining fields including a capability information field, and one or more bits defining information elements including extended capabilities field (which extends the capability information field). The duration field that follows the first frame control field specifies the duration of this transmission. And the data type frame is designed to transmit data. An address field may follow the duration field, specifying the address of the intended receiver or receivers for the transmission.

MAC sublayer logic 201 may also include data unit builder 203. Data unit builder 203 may determine a preamble based upon a preamble structure such as preamble structures 1014 and 1034 illustrated in FIG. 1 to encapsulate the MPDU to generate a PPDU. In many embodiments, data unit builder 203 may select a preamble from memory such as a default preamble for data frame transmissions, control frame transmissions, or management transmissions. In several embodiments, data unit builder 203 may create the preamble based upon a default set of values for the preamble received from another communication device. For example, a data collection station compliant with IEEE 802.11ah for a frame may periodically receive data from low power sensors that have integrated wireless communication devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a CTS or the like. In other embodiments, the sensor may transmit data to the data collection station (or an access point) in response to initiation of communications by the data collection station (or the access point).

In many embodiments, data unit builder 203 may create the preamble with the 11ah-SIG field comprising a length field that is 16 bits long with the least significant bit (LSB) first. The length field may include the length of the transmit vector (TXVECTOR). In further embodiments, data unit builder 203 may create a preamble with the 11ah-SIG field comprising a coding bit to select low density parity check (LDPC) and an extra coding bit to offer LDPC duration ambiguity. The data unit builder 203 may create the preamble with the 11ah-SIG field comprising a bit for transmit beamforming (TxBF). For example, some embodiments may set the TxBF bit to a logical one to indicate that the transmission should be beamformed for data packets to communication devices that have beamforming capabilities and may set the TxBF bit to a logical zero to indicate that the transmission should not be beamformed for, e.g., protection mechanism frames.

Transceiver 200 includes receiver 204 and transmitter 206. Transmitter 206 may include one or more of encoder 208, modulator 210, OFDM 212, and DBF 214. Encoder 208 of transmitter 206 receives data destined for transmission from MAC sublayer logic 202. MAC sublayer logic 202 may present data to transceiver 200 in blocks or symbols such as bytes of data. Encoder 208 may encode the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also include encryption for security.

In the present embodiment, encoder 208 may implement a space-time block coding (STBC) and a binary convolutional coding (BCC) or a low density parity check coding (LDPC), as well as other encodings.

Modulator 210 of transmitter 206 receives data from encoder 208. A purpose of modulator 210 is to transform each block of binary data received from encoder 208 into a unique continuous-time waveform that can be transmitted by an antenna upon up-conversion and amplification. Modulator 210 impresses the received data blocks onto a sinusoid of a selected frequency. More specifically, modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 is a band pass signal.

Transceiver 200 may also include diplexers 216 connected to antenna array 218. Thus, in this embodiment, a single antenna array is used for both transmission and reception. When transmitting, the signal passes through diplexers 216 and drives the antenna with the up-converted information-bearing signal, x. During transmission, diplexers 216 prevent the signals to be transmitted from entering receiver 204. When receiving, information bearing signals received by the antenna array pass through diplexers 216 to deliver the signal from the antenna array to receiver 204. Diplexers 216 then prevent the received signals from entering transmitter 206. Thus, diplexers 216 operate as switches to alternately connect the antenna array elements to receiver 204 and transmitter 206.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. Antenna array 218 may be implemented using printed circuit board metallization technology. Microstrips, striplines, slotlines, and patches, for example, are all candidates for antenna array 218.

Transceiver 200 may include receiver 204 for receiving, demodulating, and decoding information bearing signals. Receiver 204 may include one or more of DBF 220, OFDM 222, demodulator 224 and decoder 226. The received signals are fed from antenna elements 218 to Digital Beam Former (DBF) 220. DBF 220 transforms N antenna signals into L information signals.

The output of DBF 220 is fed to OFDM 222. OFDM 222 extracts signal information from the plurality of subcarriers onto which information-bearing signals are modulated.

Demodulator 224 demodulates the received signal. Demodulation is the process of extracting information from the received signal to produce an un-demodulated information signal. The method of demodulation depends on the method by which the information is modulated onto the received carrier signal. Thus, for example, if the modulation is BPSK, demodulation involves phase detection to convert phase information to a binary sequence. Demodulation provides to the decoder a sequence of bits of information. Decoder 226 decodes the received data from demodulator 224 and transmits the decoded information, the MPDU, to MAC sublayer logic 202.

Persons of skill in the art will recognize that a transceiver may include numerous additional functions not shown in FIG. 2 and that receiver 204 and transmitter 206 can be distinct devices rather than being packaged as one transceiver. For instance, embodiments of a transceiver may include a Dynamic Random Access Memory (DRAM), a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing.

Figure 3A:
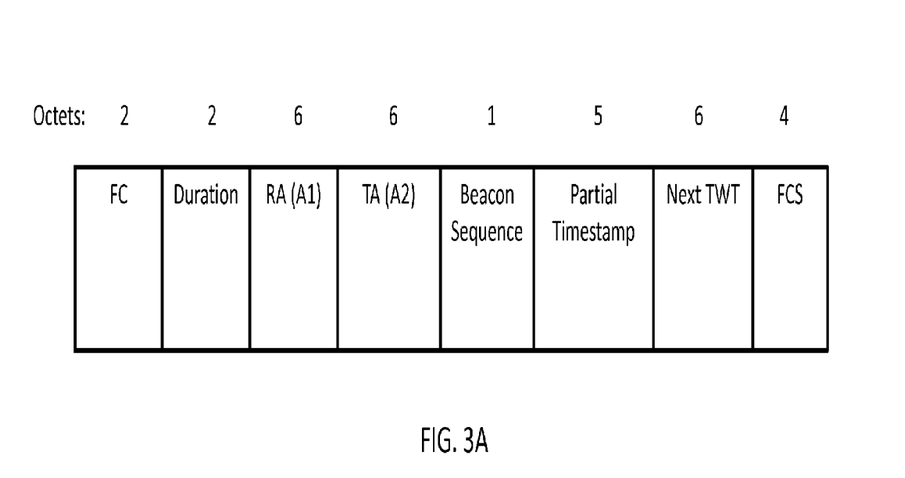
FIG. 3A depicts an embodiment of a control frame called TACK frame in accordance with various aspects and principles of the present disclosure.
Figure 3B:
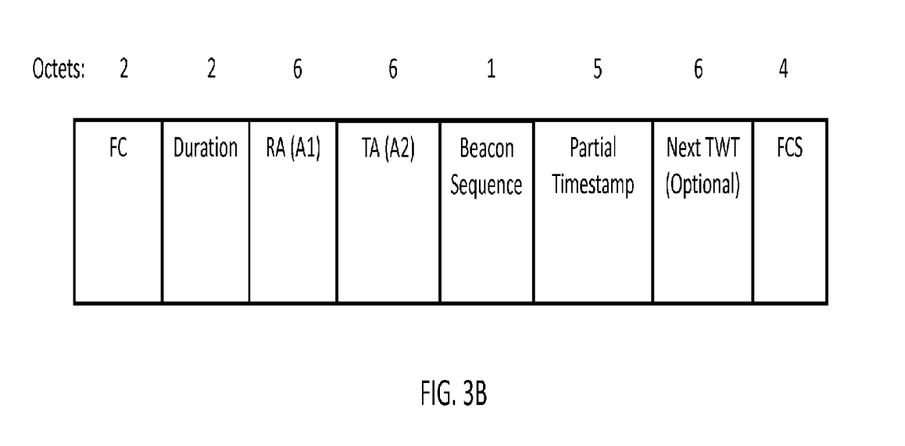
FIG. 3B depicts an alternative embodiment of a TACK frame in accordance with various aspects and principles of the present disclosure.

Referring now to FIGS. 3A, 3B, these figures illustrate embodiments of a control frame called the TACK frame in accordance with various aspects and principles of the present disclosure. The TACK frame is a control frame proposed in the 802.11ah specification and is a variant of the ACK frame that includes a Beacon Sequence field, a Partial Timestamp field, and the Next TWT field.

Various fields present in the TACK frame are as follows: (a) the RA field (6 octets) contains the address of the intended recipient of the frame; (b) the TA field (6 octets) contains the address of the transmitter of the frame; (c) the Beacon Sequence field (1 octet) contains the value of the Change Sequence Field from the most recent transmitted Beacon; (d) the Partial Timestamp field (5 octets) contains the least significant five octets of the value of the transmitting STA's time synchronization function (TSF) timer at the time that the data symbol containing the first bit of the Partial Timestamp is transmitted to the PHY plus the transmitting STA's delays through its local PHY from the MAC-PHY interface of its interface with the WM; and (e) the Next TWT field (6 octets) contains the next TWT value for the intended recipient of the frame given as the lowest six bytes of the TSF time for the next TWT. A value of 0 in the Next TWT field means that the frame does not carry a Next TWT value. Additionally, the TACK frame includes a frame control (FC) field (2 octets) that contains control information used for defining the type of 802.11 MAC frame and providing information necessary for the following fields to understand how to process the MAC frame, and a frame check sequence (FCS) field (4 octets) that is used to verify whether or not any errors occurred in the frame during the transmission.

The Next TWT field is used for a STA that has set up a TWT schedule with an AP and may not be needed for a STA that has not set up a TWT schedule. A STA that is not using the TWT may want to access the Beacon Sequence information to determine if there is any change at the AP or to sync to the AP's TSF without receiving a beacon. The Next TWT field is 6 octets long and may increase overhead if the control packet FIG. 3A is used for a STA that has not set up TWT.

In an embodiment, as depicted in FIG. 3B, the presence of the Next TWT frame may be made optional. In such embodiments, a STA that has not set up a TWT schedule with an AP may use the TACK frame, without the overhead of 6 octets caused by the Next TWT frame, to know the changes of the AP or to sync to the AP's TSF without receiving a beacon. In various embodiments, the presence (or absence) of the Next TWT frame may be indicated using a bit in the FC field of the TACK frame.

Figure 4A:
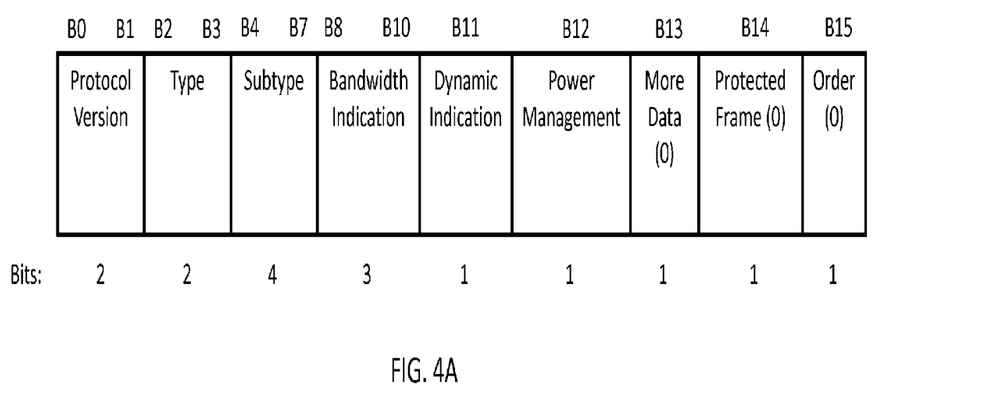
FIG. 4A depicts an embodiment of frame control field in a TACK frame in accordance with various aspects and principles of the present disclosure.

FIG. 4A depicts a typical FC field in accordance with various aspects and principles of the present disclosure. The FC field may include information such as, for example, (a) protocol version (2 bits); (b) type and subtype (2 and 4 bits respectively); (c) bandwidth indication (3 bits); (d) dynamic indication (1 bit); (e) power management (1 bit); (f) more data (1 bit); (g) protected frame (1 bit); and order (1 bit). The type and sub-type subfield is used to determine the function of the frame.

Figure 4B:
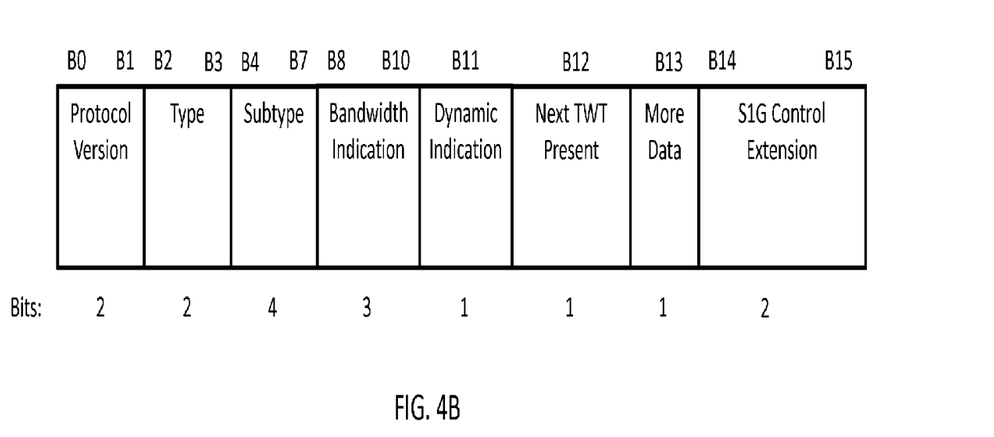
FIG. 4B depicts an alternative embodiment of frame control field in a TACK frame in accordance with various aspects and principles of the present disclosure.

FIG. 4B depicts an alternative FC field in accordance with various aspects and principles of the present disclosure. The alternative FC field which may include information such as, for example, protocol version (2 bits), type and subtype (2 and 4 bits respectively), bandwidth indication (3 bits), dynamic indication (1 bit), Next TWT Present (1 bit), More Data (1 bit), S1G Control Extension (2 bits).

In some embodiments, the S1G Control Extension field may be used to indicate the S1G control frames according to a scheme as depicted in Table 1 below:

TABLE 1

Determination of S1G control frames.

| | Type | Subtype | S1G Control Extension |
|---|---|---|---|
| TACK | 01 | 0011 | 00 |
| STACK | 01 | 0011 | 01 |
| BAT | 01 | 0011 | 10 |
| Reserved | 01 | 0011 | 11 |

Figure 5:
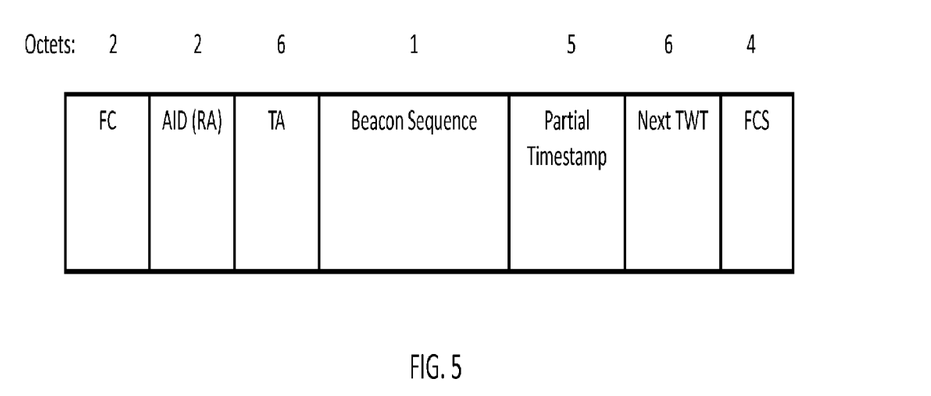
FIG. 5 depicts an embodiment of a STACK frame in accordance with various aspects and principles of the present disclosure.
Figure 6:
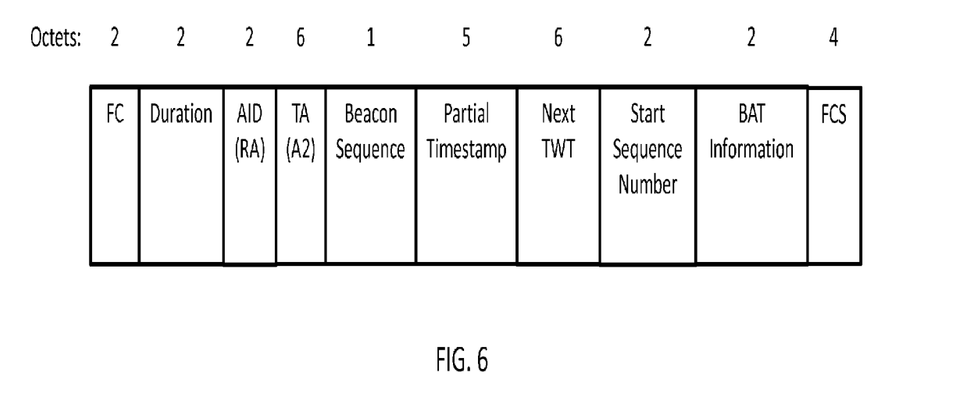
FIG. 6 depicts an embodiment of a BAT frame in accordance with various aspects and principles of the present disclosure.

FIG. 5 depicts an embodiment of the STACK control frame and FIG. 6 depicts an embodiment of the BAT control frame in accordance with various aspects and principles of the present disclosure. As can be seen in FIGS. 5 and 6, the STACK and BAT control frames contain information similar to the TACK control frame. As such, the modified FC field depicted in FIG. 4B may be used for the STACK and BAT frames, in various embodiments, for reducing overhead caused by the Next TWT field in embodiments where a STA has not set up a TWT schedule with an AP.

An embodiment may be implemented as an apparatus having a transceiver configured to transmit a first data unit comprising the control frame to a device to associate the apparatus with the device in a wireless network, and hardware equipment such as, for example, a processor, configured to implement the methods described herein.

Another embodiment is implemented as a program product for implementing systems and methods described herein. Some embodiments can take the form of an entirely hardware embodiment, an entirely software embodiment, or an embodiment containing both hardware and software elements. Some embodiments may be implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

EXAMPLES

The following examples highlight non-limiting characteristics and attributes of the various and principles of the present disclosure:

Example 1 is a method for enabling a station (STA) lacking a target wake time (TWT) schedule to determine access point (AP) changes or to sync with the AP, the method comprising: using one bit in a frame control (FC) field of a control frame to indicate a presence of a Next TWT field, wherein the Next TWT field is optionally present in the control frame, and wherein the Next TWT field contains the next target wake time value for an intended recipient of the control frame.

Example 2 is the method of example 1, wherein the control frame is an S1G control frame including one or more of a TACK frame, a STACK frame, and a BAT frame.

Example 3 is the method of any one of examples 1 or 2, wherein two bits in the FC field are used to indicate different control frames.

Example 4 is the method of any one of examples 1-3, wherein one subtype value in the FC field is used to indicate the frame as a S1G control frame or a TGah control frame.

Examples 5 is a system for enabling a station (STA) lacking a target wake time (TWT) schedule to determine access point (AP) changes or to sync with the AP, the apparatus comprising: a medium access control sublayer logic module configured to generate a frame comprising a bit set to a value, wherein the value of the bit indicates whether the apparatus supports an optional Next TWT field, the Next TWT field containing the next target wake time value for an intended recipient of a control frame; and a transceiver configured to transmit a first data unit comprising the control frame to a device to associate the apparatus with the device in a wireless network.

Example 6 is the system of example 5, wherein the control frame comprises a frame control bit including a bit to indicate a presence of the Next TWT field.

Example 7 is the system of any one of examples 5 or 6, wherein the control frame is an S1G control frame including one or more of a TACK frame, a STACK frame, and a BAT frame.

Example 8 is the system of any one of examples 5-7, wherein two bits in the FC field are used to indicate different control frames.

Example 9 is the system of any one of examples 5-8, wherein one subtype value in the FC field is used to indicate the frame as a S1G control frame or a TGah control frame.

Example 10 is a computer program product comprising a computer-readable medium having computer program logic recorded thereon arranged to execute the method of any of examples 1-4.

Example 11 is a computer-readable medium comprising computer-readable code physically embodied thereon which, when executed by a processor, causes the processor to perform a method of any one of examples 1-4.

Example 12 is an electronic device comprising means for performing a method of any one of examples 1-4.

Example 13 is an electronic device comprising a processor, in communication with a memory, for executing instructions to perform a method of any one of examples 1-4.

Example 14 is a system comprising means for performing a method of any one of examples 1-4.

Example 15 is a system comprising at least one electronic device comprising a processor, in communication with a memory, for executing instructions to perform a method of any one of examples 1-4.

Example 16 is a method of example 1, wherein two bits in the FC field are used to indicate different control frames.

Example 17 is the method of example 1, wherein one subtype value in the FC field is used to indicate the frame as a S1G control frame or a TGah control frame.

Example 18 is the system of example 5, wherein the control frame is an S1G control frame including one or more of a TACK frame, a STACK frame, and a BAT frame.

Example 19 is the system of example 5, wherein two bits in the FC field are used to indicate different control frames.

Example 20 is the system of example 5, wherein one subtype value in the FC field is used to indicate the frame as a S1G control frame or a TGah control frame.

Example 21 is a computer program product comprising a computer-readable medium having computer program logic recorded thereon arranged to execute the method of example 1.

Example 22 is a computer-readable medium comprising computer-readable code physically embodied thereon which, when executed by a processor, causes the processor to perform a method of example 1.

Example 23 is an electronic device comprising means for performing a method of example 1.

Example 24 is an electronic device comprising a processor, in communication with a memory, for executing instructions to perform a method of example 1.

Example 25 is a system comprising means for performing a method of example 1.

Example 26 is a system comprising at least one electronic device comprising a processor, in communication with a memory, for executing instructions to perform a method of example 1.

Example 27 is a computer-readable medium comprising computer-readable instructions to implement, when executed, the method of example 1.

Example 28 is a computer-readable medium comprising computer-readable instructions to implement, when executed, the method of any one of examples 1-4.

What is claimed is:

1. A method for enabling a station (STA) lacking a target wake time (TWT) schedule to determine access point (AP) changes or to sync with the AP, the method comprising:
    using one bit in a frame control (FC) field of a control frame to indicate a presence of a Next TWT field,
    wherein the Next TWT field is optionally present in the control frame, and
    wherein the Next TWT field contains the next target wake time value for an intended recipient of the control frame.

2. The method of claim 1, wherein the control frame is an S1G control frame including one or more of a TACK frame, a STACK frame, and a BAT frame.

3. The method of claim 1, wherein two bits in the FC field are used to indicate different control frames.

4. The method of claim 1, wherein one subtype value in the FC field is used to indicate the control frame as a S1G control frame or a TGah control frame.

5. The method of claim 1, further comprising generating the control frame, wherein a first value of the bit enables the station lacking the TWT schedule to determine AP changes or to sync with the AP based on the control frame.

6. The method of claim 1, wherein the first value of the bit indicates that the Next TWT field is not present in the control frame.

7. A system for enabling a station (STA) lacking a target wake time (TWT) schedule to determine access point (AP) changes or to sync with the AP, the apparatus comprising:
    a medium access control sublayer logic module configured to generate a control frame comprising a bit set to a value, wherein the value of the bit indicates whether the apparatus supports an optional Next TWT field, the Next TWT field containing the next target wake time value for an intended recipient of a control frame; and
    a transceiver configured to transmit a first data unit comprising the control frame to a device to associate the apparatus with the device in a wireless network.

8. The system of claim 7, wherein the control frame comprises a frame control (FC) field including a bit to indicate a presence of the Next TWT field.

9. The system of claim 8, wherein two bits in the FC field are used to indicate different control frames.

10. The system of claim 8, wherein one subtype value in the FC field is used to indicate the control frame as a S1G control frame or a TGah control frame.

11. The system of claim 7, wherein the control frame is an S1G control frame including one or more of a TACK frame, a STACK frame, and a BAT frame.

12. The system of claim 7, wherein a first value of the bit enables the station lacking the TWT schedule to determine AP changes or to sync with the AP based on the control frame.

13. The system of claim 7, wherein the first value of the bit indicates that the Next TWT field is not present in the control frame.

14. A non-transitory computer-readable medium comprising computer-readable code physically embodied thereon which, when executed by a processor, causes the processor to perform operations comprising:

using one bit in a frame control (FC) field of a control frame to indicate a presence of a Next TWT field, wherein the Next TWT field is optionally present in the control frame, and wherein the Next TWT field contains the next target wake time value for an intended recipient of the control frame.

15. The medium of claim 14, wherein the control frame is an S1G control frame including one or more of a TACK frame, a STACK frame, and a BAT frame.

16. The medium of claim 14, wherein two bits in the FC field are used to indicate different control frames.

17. The medium of claim 14, wherein the operations further comprise generating the control frame, wherein a first value of the bit enables the station lacking the TWT schedule to determine AP changes or to sync with the AP based on the control frame.

18. The medium of claim 14, wherein the first value of the bit indicates that the Next TWT field is not present in the control frame.

\* \* \* \* \*